Patented Oct. 15, 1935

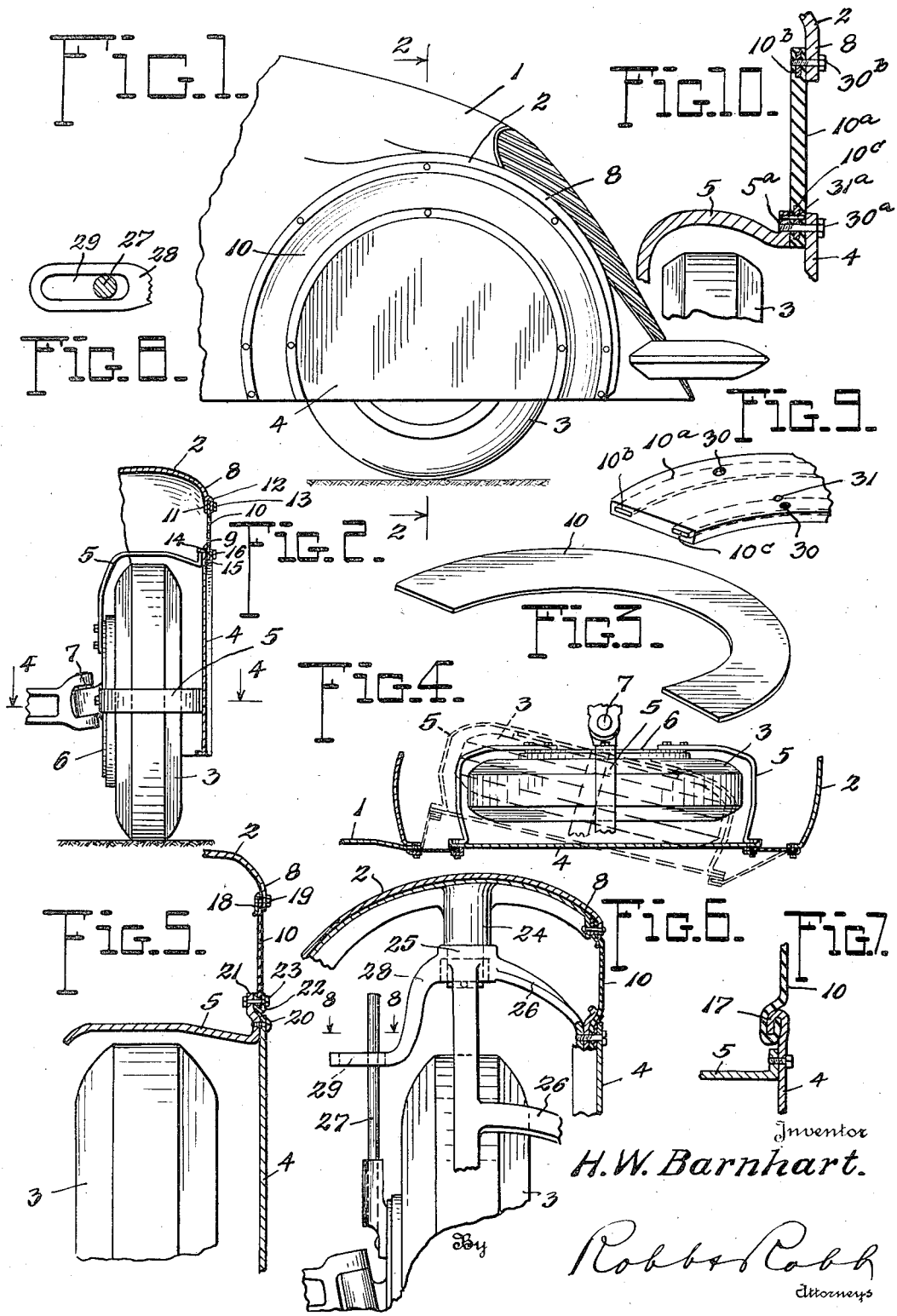

2,017,227

UNITED STATES PATENT OFFICE 2,017,227

WHEEL GUARD STRUCTURE

Homer W. Barnhart, Akron, Ohio

Application December 31, 1934, Serial No. 760,012

3 Claims. (Cl. 280—153)

This invention relates to streamlining and more particularly to the streamlining of the steerable wheels of automotive vehicles and the like.

With the present trend toward streamlining in the automotive vehicle art, the contour of the vehicle body and fenders has been modified so as to substantially enclose all of the sub-structure, including the wheels, with the exception of the steerable wheels at the front of the vehicle.

In the usual designs which have been adopted up to the present time, the front wheels have been left fully exposed at the sides in order to permit the same to be turned on their spindles in the usual steering operations. This exposure of the wheels not only detracts from the appearance of the vehicle in not conforming to the rest of the streamlining design, but also detracts materially from the effectiveness of the streamlining action by forming pockets which set up appreciable air resistance, especially at high speeds.

It is an object of the present invention, therefore, to carry out the general streamlining principles so as to complete the streamlining design and provide a full streamlining action.

The invention further contemplates the provision of suitable devices which may be attached to the present day conventional bodies so as to complete the streamlining idea which is becoming more and more predominant.

The invention has for a further object the provision of a deflector plate supported at the outer side of each steerable wheel and in substantial alignment with the outer edge of the usual fenders, the plate being so mounted as to be moved along with the vehicle wheel during steering so as to remain substantially parallel to the plane of the wheel.

The invention also contemplates the provision of suitable resiliently stretchable material intermediate the movable plate above referred to and the adjacent edge of the fender or body so as to prevent the entrance of air in between the plate and the fenders or body, and capable of accommodating any relative movement between the plate and the fender or body incident to steering operation of the wheels, and relative vertical movements of the wheels incident to the absorbing of the road shocks.

It is a further object of the invention, where desired, to mount the deflector plate so as to eliminate the transmission of vertical movement of the steerable wheels to the deflector plate, yet permitting the deflector plate to swing with the steerable wheels so as to remain in a plane substantially parallel to the plane of the wheels.

Other and further objects and advantages of the invention will be hereinafter referred to and the novel features thereof defined by the appended claims.

In the drawing—

Figure 1 is a fragmentary view in side elevation of the forward portion of an automotive vehicle of conventional design having the present invention incorporated therein.

Figure 2 is a partial sectional view taken approximately on the line 2—2 of Figure 1, looking in the direction of the arrows, the wheel and supporting spider being shown in elevation.

Figure 3 is a detail view in perspective of the flexible resiliently stretchable element.

Figure 4 is a horizontal sectional view taken approximately on the line 4—4 of Figure 2, looking in the direction of the arrows, the wheel and supporting spider being shown in elevation.

Figure 5 is an enlarged detail fragmentary sectional view showing a modified manner of mounting the flexible resiliently stretchable member.

Figure 6 is a view generally similar to Figure 2 but showing a modified form of mounting for the deflector plate whereby the same is held against movement vertically, but is permitted to swing about a vertical axis incident to steering action of the wheels so as to remain substantially parallel to the plane of the wheels.

Figure 7 is a fragmentary detail sectional view of a further modified construction for securing the flexible resiliently stretchable member to the deflector plate.

Figure 8 is an enlarged detail sectional view taken approximately on the line 8—8 of Figure 6.

Figure 9 is a perspective view of a portion of a modified structure of the flexible resilient stretchable element.

Figure 10 is a diagrammatic sectional view illustrating how the element of Figure 9 may be mounted on the spider arms and the lateral edge of the fender.

Like reference characters designate corresponding parts in the several figures of the drawing, wherein 1 denotes generally the forward section of an automobile body of well known design, having the usual fender portions 2 overlying the steerable wheels 3. In actual construction the fenders are substantially semi-circular in form and spaced from the wheels 3 a suitable distance to admit of relative movement between the wheels and the fenders in accommodating road shocks.

According to the present invention, I propose to mount a cover or deflector plate 4 at the outer side of the wheels 3 and suitably spaced therefrom so as to avoid contact therewith, the cover plate being generally of the same shape as the area defined by the outer edge of the fender 2, being smaller than said area so as to provide a space intermediate the edge of the plate 4 and the edge of the fender. Any suitable means for supporting said plate may be employed, as for example by bracket arms 5 which are suitably mounted so as to turn with the wheel 3 during steering operations. The bracket arms, which in a sense constitute a spider, may be mounted on the rear plate 6 of the usual brake drum found on the inner side of the wheels 3. This plate does not ordinarily turn with the brake drum in rotation of the wheel 3, but is held against rotation yet swings with the wheel about the steering spindle 7 during steering operation. Obviously, the spider or arms 5 may be directly mounted on the movable spindle arm, or may form an integral part therewith.

As hereinbefore mentioned, the edge of the deflector or guard plate 4 is spaced from the outer edge 8 of the fender and normally lies in a plane substantially co-extensive with said outer edge when the wheels 3 are positioned for stering the vehicle directly straight ahead. This space must be sufficient to permit the plate 4 to move vertically with the wheel 3 relatively to the fender and body in shock absorbing functional action. A space of approximately 4½" will be found to be satisfactory for this purpose.

Attached to the edge 9 of the plate 4 and to the outer lateral edge 8 of the fender, is a flexible resiliently stretchable member 10 which serves to close the space intermediate the plate 4 and the fender, thereby coacting with the plate and fender portion to substantially fully enclose the wheel 3. This member 10 may be made of sheet rubber material which has the characteristic of being stretchable in all directions without becoming permanently deformed. In other words, it is desirable that the flexible member 10 shall be of such material as to be capable of always returning to its normal shape after stretching. Any suitable means for securing the edges of the member 10 to the fender 2 and to the plate 4 may be availed of. In Figure 2 I have shown one way of connecting the member 10 to the fender and plate. As shown, the fender is provided with a double wall at the extreme edge, comprising spaced walls 11 and 12 forming a channel into which the edge of the member 10 is received. Bolts 13, passing through the walls 11 and 12 and through the member 10, may be employed to pull the walls 11 and 12 together and create a clamping action on the edge of the member 10. Similarly, the spider arms 5 may carry a double-walled ring, the walls of which are designated 14 and 15, forming a channel for receiving the inner edge of the member 10, bolts 16 being provided to clamp the ring to the flexible member 10. It is to be understood that I do not wish to be limited to the fastenings above described, as other suitable means for securing the flexible member 10 to the fender and to the plate 4 may be availed of.

In Figure 7 I have shown a modified form of connection between the plate 4 and the member 10, the plate being provided with a reversely bent edge 17 forming a channel into which the edge of the member 10 is received and clamped by a crimping of the edge 17. In like manner, the member 10 may be fastened to the fender 2 by crimping the outer edge 8 of the fender over the edge of the member 10. Of course, if desired, the member 10 may be directly applied to the inner or outer surfaces of the fender edge 8 and the edge of the plate 4 by screws, bolts, or other fastening means, preferably of a detachable character so as to permit the plate 4 to be removed for purposes of changing the wheels 3 or the tires, as required in the event of blow-outs or punctures.

Figure 5 shows a still further modified fastening for connecting the member 10 to the fender edge 8 and to the plate 4. In this form the fender edge 8 is provided with an inwardly spaced clamping lip or flange 18 adapted to exert a clamping action on the member 10 upon tightening the bolts 19. As a further modification of the connection between the member 10 and the plate 4, Figure 5 also shows the plate 4 separately secured to the spider arms 5 by bolts or screws 20, the spider arms being upwardly extended to form a support 21 for a U-shaped channel ring 22, into which the edge of the member 10 is received and fastened to the supports 21 by bolts 23.

In the construction above described, it will be apparent that the plate 4 will have movement corresponding to the movement of the wheel 3, both in an up and down direction relatively to the vehicle body or fender, and in a direction corresponding to the steering motion of the wheel. In some cases it may be desirable to prevent the relative up and down motion of the plate 4 above referred to, for which purpose I have shown a modified construction in Figures 6 and 8. In this construction, the spider for supporting the plate 4, instead of being mounted on the steering spindle or brake drum, as previously described, is mounted on the underside of the fender for pivotal movement about a vertical axis. For this purpose, the fender may be provided with a projecting pin or axle 24 which is adapted to receive the spider bearing or collar 25, which may be held thereon in any suitable manner to prevent its dropping downwardly after being slipped on to the pin. In this case the spider arms 26 extend toward the outer side of the wheel 3 to support the plate 4 and they need not be extended toward the inner side of the wheels, as in the previously described form. The steering movement of the wheel 3 is translated into a pivoting movement of the spider by an upstanding arm 27 which is carried on the inner face of the brake drum or on the wheel spindle, this arm 27 having sliding engagement with an inwardly extending arm 28 projecting from the spider. The arm 28 is provided with a slot 29 to cooperate with the arm 27. The action of this arrangement will readily become apparent from the drawing.

The flexible member 10 may be connected to the plate 4 and to the fender edge 8 by any of the various ways previously described or by suitable modification thereof.

It will be clear that the provision of a cover or deflector plate 4, as herein disclosed, completes the streamlining design at that portion of the vehicle which has heretofore been left open. In its broadest aspect, therefore, the invention eliminates the formation of air pockets of any substantial extent around the steerable wheels.

In the operation of the invention, the action will be best understood by reference to Figure 4, the deflector plate and supporting structure being shown in full lines in the position which it assumes when the steering wheel is in a position for steering straight ahead. In the same figure the dotted line position shows the parts in the position assumed when the steering wheel is turned as in going around a curve. Obviously, the deflector plate will turn more or less than is illustrated, according to the degree of movement of the steerable wheel. The action of the modified construction shown in Figure 8 conforms generally to that illustrated in Figure 4, in so far as the streamlining function is concerned, with the exception that in the Figure 6 construction the spider turns about a pivot which is not the same as the pivot of the steerable wheel spindle. Accordingly, the arrangement of the lever arms 27 and 28 should be worked out so that the plate 4 remains substantially parallel to the plane of the steerable wheel 3.

In Figure 9 there is shown a modified structure of a flexible element designated 10a which comprises metal reinforcement strips 10b and 10c. Openings 30 passing through the flexible element and metal strips permit the insertion of bolts 30a and 30b which are used to secure the flexible element to the fender portion 8 and the flanges 5a of the bracket arms 5, also securing plate 4 to the flanges 5a as shown in Figure 10. The flanges 5a of the bracket arms 5 are also provided with dowel pins 31a adapted to be introduced into openings 31 in the flexible member and reinforcement strips 10c to facilitate an easier attachment of the parts as will be clearly understood from Figure 10. The remaining structure of the arrangement of Figure 10 is substantially the same as shown in reference to Figure 2 and the flexible element 10a is of a like configuration to the element 10 of Figure 3.

It is to be understood that the invention disclosed herein is applicable to those vehicles generally illustrated by way of example, but also, by suitable modifications of other designs, the present invention may be incorporated therein. While the specific details have been herein shown and described, the invention is not to be confined thereto, as changes and alterations may be made without departing from the spirit thereof as defined by the appended claims.

Having thus described my invention, what I claim as new and desire to secure by Letters Patent of the United States, is—

1. The combination with a vehicle body structure having a fender portion for cooperating with a steerable wheel forming a part of the usual vehicle running gear, said fender portion extending substantially about the wheel circumferentially and spaced therefrom to permit relative movement between the wheel and the body structure, and the fender portion extending laterally outwardly from the body structure over the wheel and defining a laterally open guard therefor, of a cover plate for substantially closing the guard opening, means for maintaining said cover plate in substantially parallel relation to said wheel during steering operation of the latter and independently of the fender portion, and closure means intermediate said cover plate and fender portion, for maintaining the substantially closed condition of the guard irrespective of the position of the cover plate in maintaining its parallel relation to the wheel aforesaid.

2. The combination with a vehicle body structure having a fender portion for cooperating with a steerable wheel forming a part of the usual vehicle running gear, said fender portion extending substantially about the wheel circumferentially and spaced therefrom to permit relative movement between the wheel and the body structure, and the fender portion extending laterally outwardly from the body structure over the wheel and defining a laterally open guard therefor, of a cover plate for substantially closing the guard opening, means for maintaining said cover plate in substantially parallel relation to said wheel during steering operation of the latter, and resiliently yieldable closure means intermediate said cover plate and fender portion, for maintaining the substantially closed condition of the guard irrespective of the position of the cover plate in maintaining its parallel relation to the wheel aforesaid.

3. The combination with a vehicle body structure having a fender portion for cooperating with a steerable wheel forming a part of the usual vehicle running gear, said fender portion extending substantially about the wheel circumferentially and spaced therefrom to permit relative movement between the wheel and the body structure, and the fender portion extending laterally outwardly from the body structure over the wheel and defining a laterally open guard therefor, of a vertically disposed cover plate laterally spaced from said body structure and substantially vertically aligned with the outer lateral edge of the fender portion, the edge of said cover plate being spaced from the said outer edge of the fender portion and defining therebetween an arcuate opening, an arcuate resiliently yieldable closure member secured to the outer edge of the fender portion and the adjacent edge of the cover plate, and means for imparting to said cover plate a swinging motion about a vertical axis incident to steering said steerable wheel.

HOMER W. BARNHART.